(12) United States Patent
Reagan

(10) Patent No.: US 12,077,980 B1
(45) Date of Patent: Sep. 3, 2024

(54) GROUP OR CROWD SPACING DEVICE

(71) Applicant: John Reagan, Fort Lauderale, FL (US)

(72) Inventor: John Reagan, Fort Lauderale, FL (US)

( * ) Notice: Subject to any disclaimer, the term of this patent is extended or adjusted under 35 U.S.C. 154(b) by 245 days.

(21) Appl. No.: 17/697,869

(22) Filed: Mar. 17, 2022

Related U.S. Application Data

(60) Provisional application No. 63/162,446, filed on Mar. 17, 2021.

(51) Int. Cl.
*E04H 17/18* (2006.01)
*E04H 17/16* (2006.01)

(52) U.S. Cl.
CPC .......... *E04H 17/18* (2013.01); *E04H 17/16* (2013.01)

(58) Field of Classification Search
CPC ....... E04H 17/16; E04H 17/18; A47D 13/063; A47D 13/066; E01F 13/02; E01F 13/022; E01F 13/028
See application file for complete search history.

(56) References Cited

U.S. PATENT DOCUMENTS

| | | | | |
|---|---|---|---|---|
| 5,826,285 A * | 10/1998 | Mariol | ................. | A47D 13/063 5/99.1 |
| 6,971,329 B1 * | 12/2005 | Stewart | ................... | E01F 9/654 116/63 P |
| 7,926,500 B2 * | 4/2011 | Perez | ................... | A47D 13/066 135/125 |
| 10,194,755 B1 * | 2/2019 | Flannery | ............... | A47D 13/063 |
| 10,704,290 B1 * | 7/2020 | Flannery | ................. | E04H 15/02 |

* cited by examiner

*Primary Examiner* — Michael P Ferguson
(74) *Attorney, Agent, or Firm* — David P. Lhota, Esq.; Lhota & Associates, P.A.

(57) ABSTRACT

A group spacing device for keeping groups of people at least six feet apart or some other determined distance from other groups of people the group spacing device having four outer connection adapters joined by four corresponding exterior border strips, four inner connection adapters joined by at least four poles, at least four poles joining the outer connection adapters to corresponding inner connection adapters, a fence assembly that mounts to the outer connection adapters so as to stretch across and above the exterior border strips, a plurality of screw anchors that passes through apertures in the outer connection adapters and or inner connection adapters until stopped by an anchor stop to secure the group spacing device to a sand or ground surface and a tent mountable over the group spacing device.

8 Claims, 10 Drawing Sheets

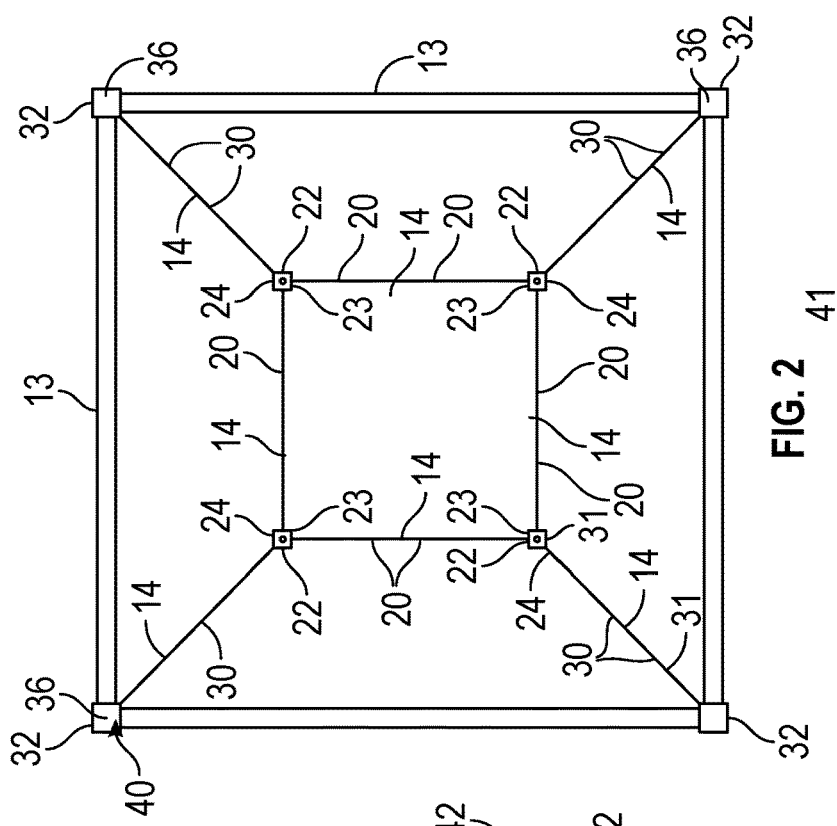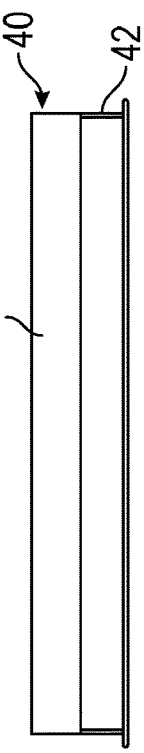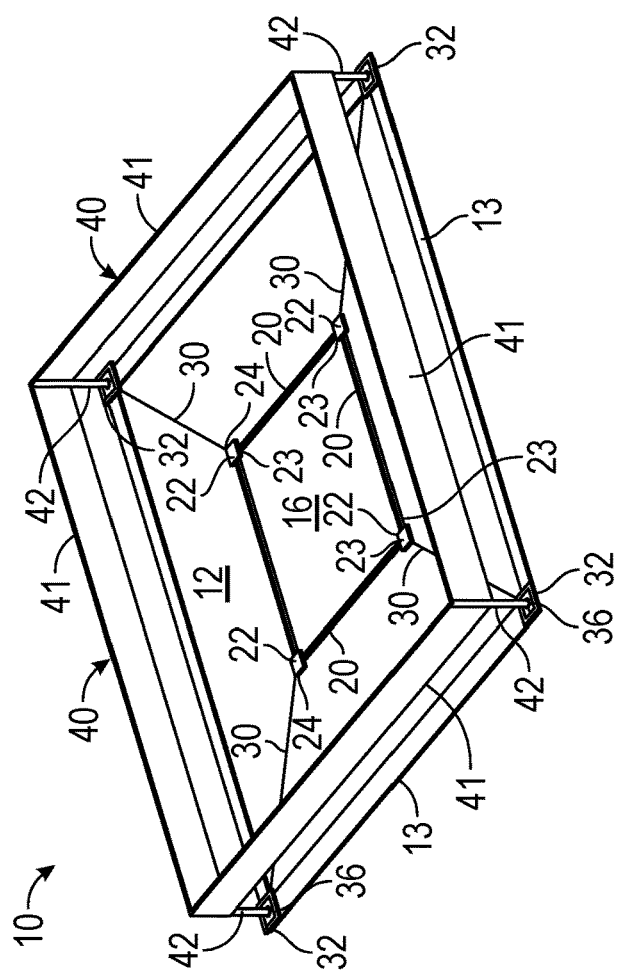

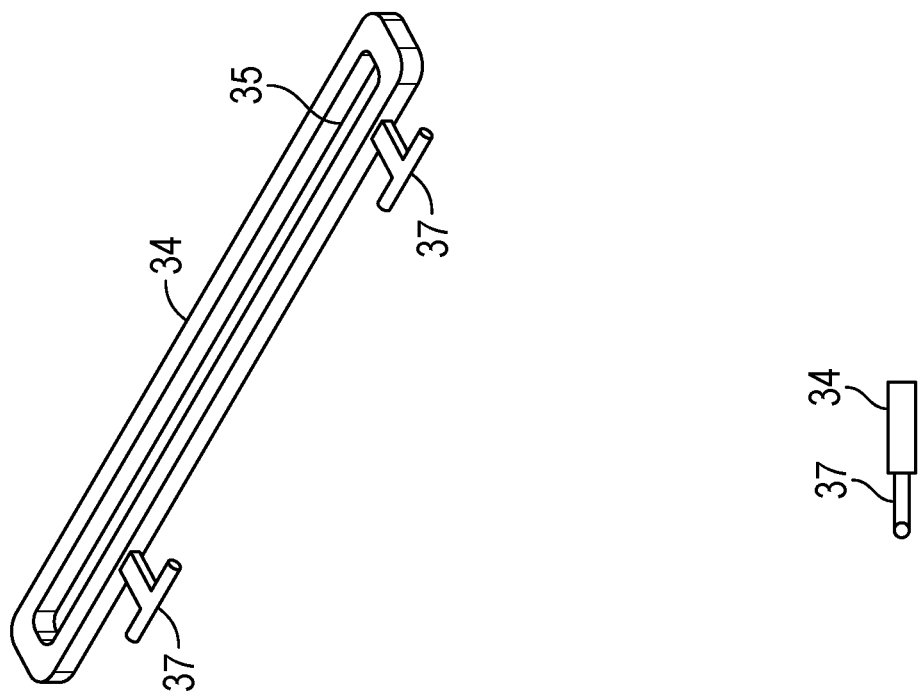
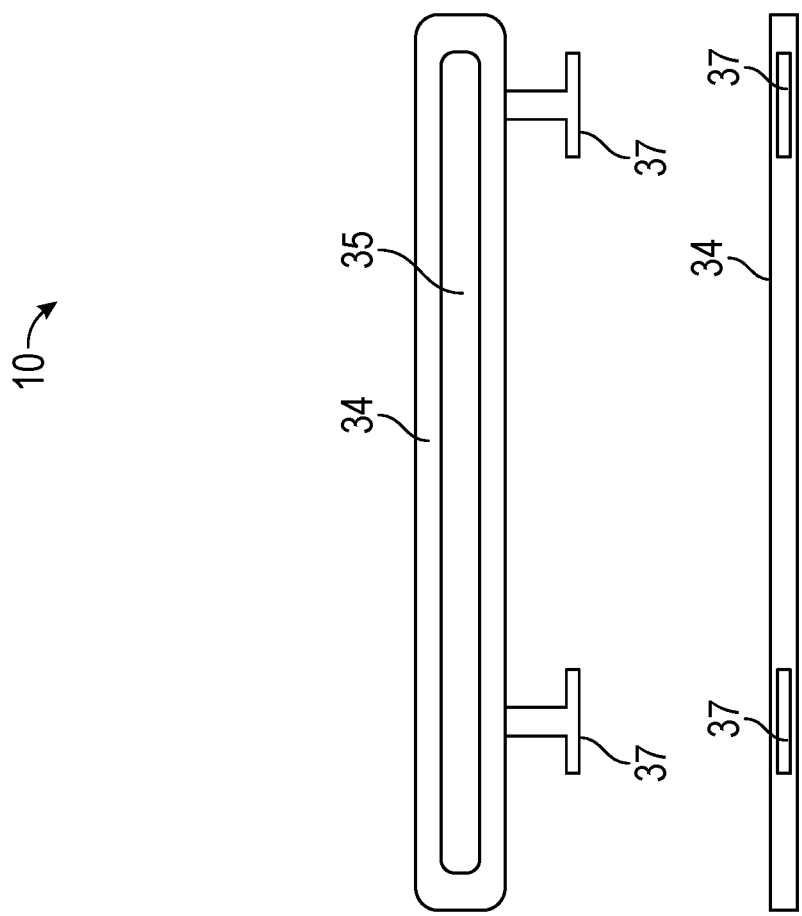
FIG. 7

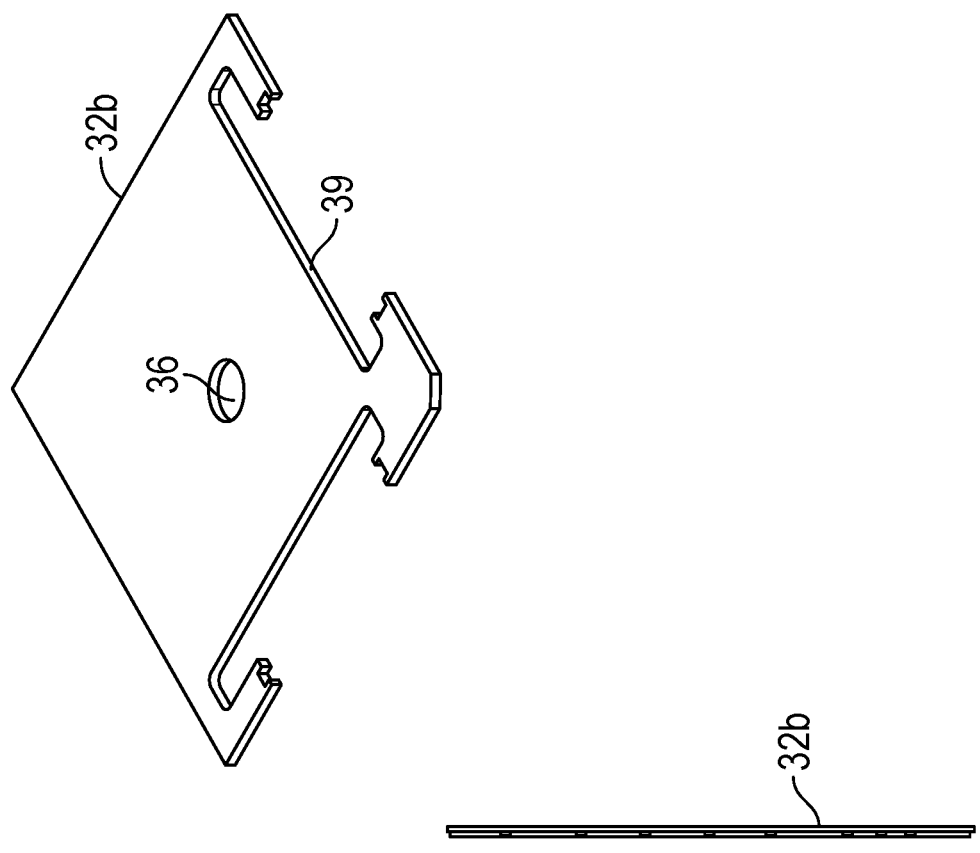
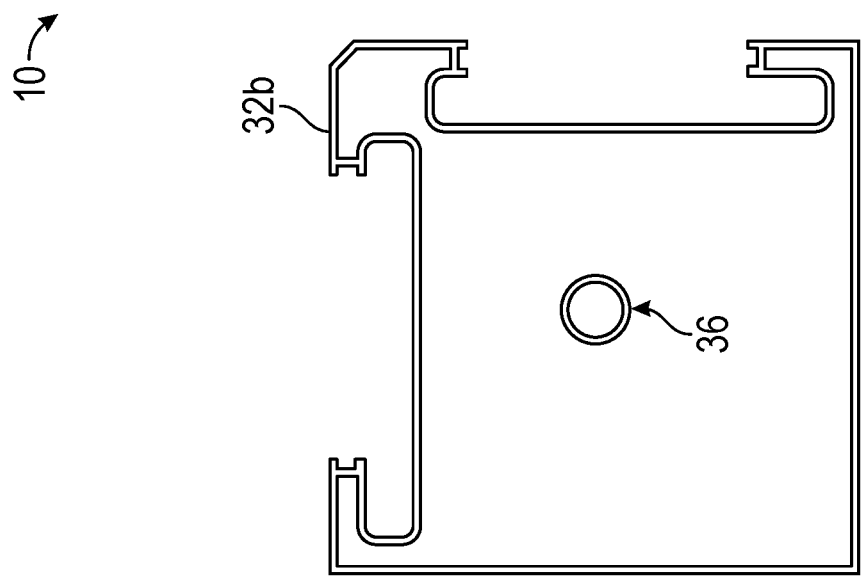
FIG. 8

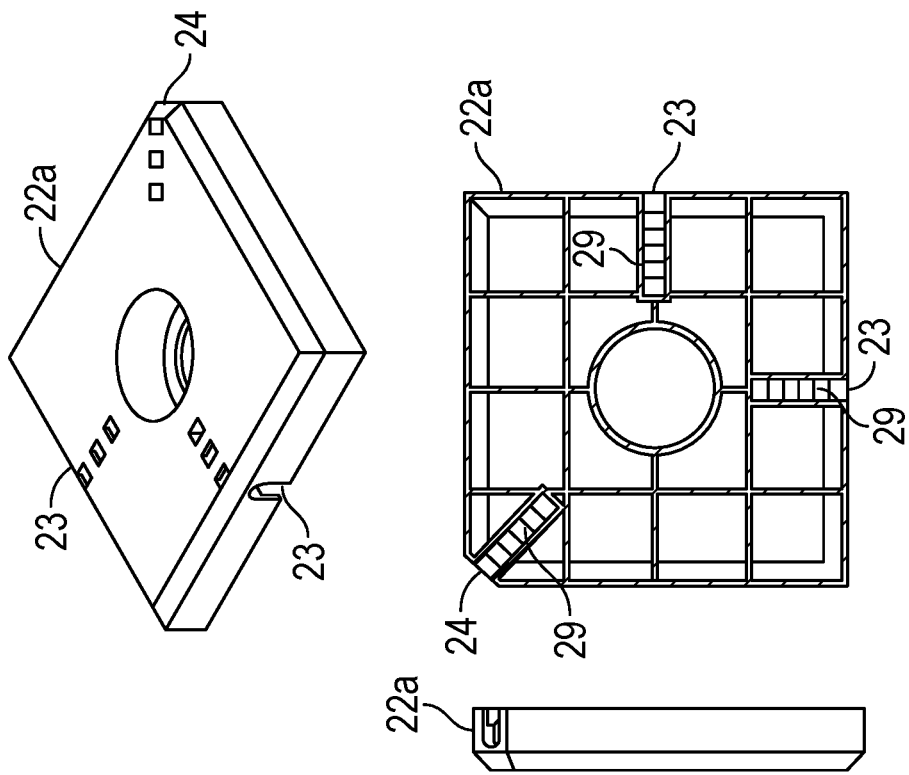
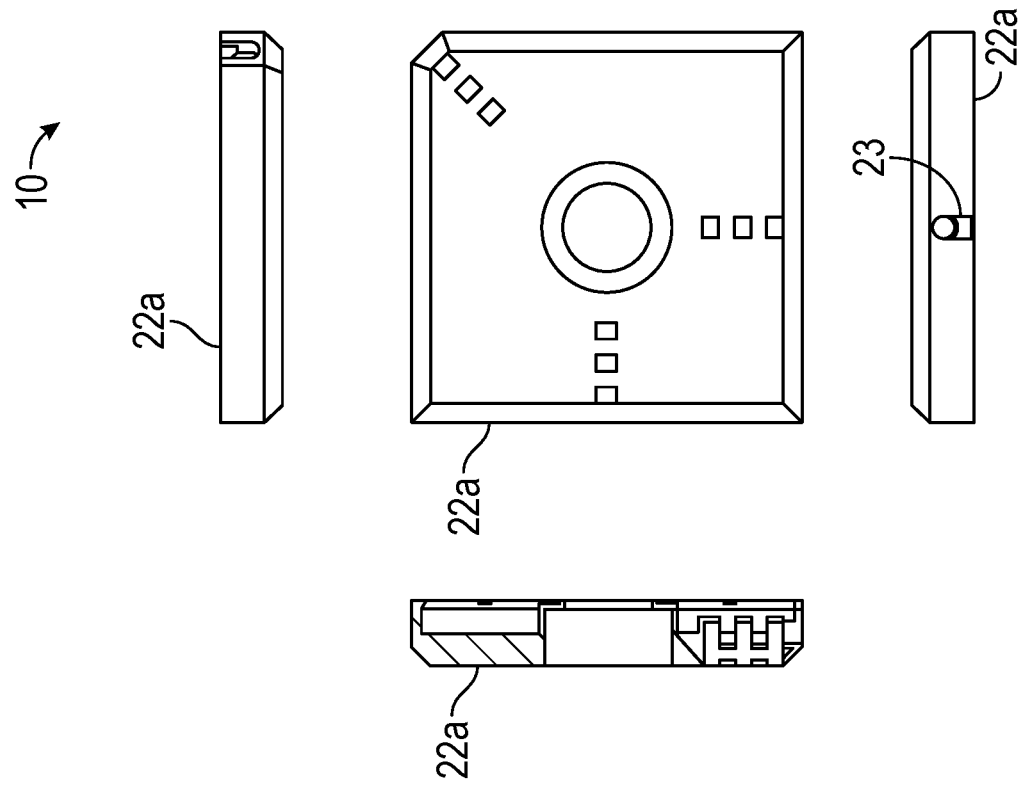
FIG. 10

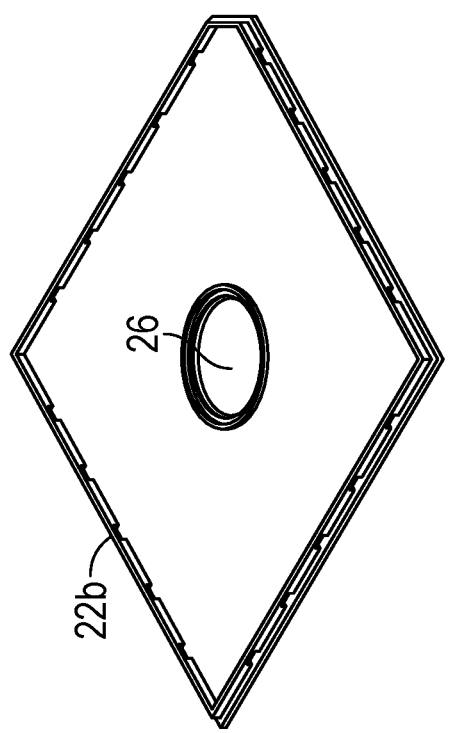
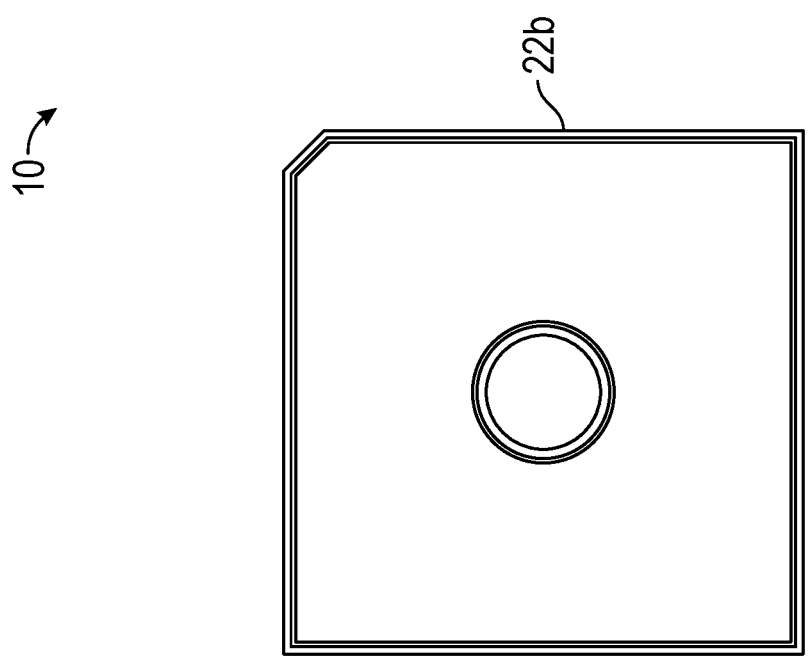
FIG. 11

GROUP OR CROWD SPACING DEVICE

CROSS-REFERENCE TO RELATED APPLICATION

This application claims the benefit of U.S. provisional patent application Ser. No. 63/162,446 filed Mar. 17, 2021.

STATEMENT REGARDING FEDERALLY SPONSORED RESEARCH OR DEVELOPMENT

N/A

FIELD OF THE INVENTION

The present invention relates generally to a family, crowd or group spacing device, and in particular, to a family or group blanket or platform device for separating safely a family or group of predetermined number of people in a crowd a predetermined distance from other groups of people at social events such as at the beach, park or concert, for adhering to suggested safe social distance protocols to limit potential exposure to unknown viruses or germs, such as COVID-19 or the like.

BACKGROUND OF THE INVENTION

The importance of "proper" social distancing is discussed and advised daily on an ongoing basis. If is advised that people should keep themselves at least six feet from other people to minimize the likelihood of social contact either physically or through airborne bodily fluids, small viral particles or bodily air transmissions. The premise is to prevent oneself from coming in proximity or contact with another's bodily fluid or air borne contaminants or from exposing another to their own bodily fluids or air borne contaminants when in a crowd of people.

It is known that is particularly difficult to practice proper social distancing at large events or in large crowds, such as at concerts or at the beach. This can be particularly difficult for families or groups of people that are together to stay socially distant from other groups or families. This is because people within their own group easily stray within six feet of other groups unbeknownst to them. In fact, it is more problematic to properly distance oneself or group when the groups and gatherings are six people or larger than six persons. This is because people within a group can unknowingly stray from their own group and encroach on another group. This could be true at the beach, concerts, stage shows or other events. While a rope could be used to wrap around a group or their placement within a ground space, a rope is easily moved and not necessarily accurate. In addition, it does not do anything to help people within their own group to maintain proper social distancing.

Unfortunately, there are no devices or systems known that adequately and effectively assure or enable proper social distancing between different groups and, or within groups. If there existed such a social distancing device that was both reliable and effective in maintaining proper social distancing, such as six feet, between different groups as well as between people within their own group, it would be well received. As there are no known devices or systems that achieve or enable these social distancing practices, there exist a need for such a device or system. It is, therefore, to the effective resolution of the aforementioned problems and shortcomings of the prior art that the present invention is directed. The instant invention addresses this unfulfilled need in the prior art by providing a social distancing device or spacing system as contemplated by the instant invention disclosed.

SUMMARY OF THE INVENTION

In the present invention, these purposes, as well as others which will be apparent, are achieved generally by providing a group spacing device that separates a group of people in places or venues with crowds or many groups of people such as beaches, parks, outdoor concerts, or similar events.

It is also an object of the instant invention to provide a group spacing device that accommodates proper social distancing during pandemics or to abide by proper health guidelines.

It is another object of the instant invention to provide a group spacing device that accommodates proper social distancing during pandemics or to abide by proper health guidelines.

It is an additional object of the instant invention to provide a group spacing device that is cost-effective for mass production and distribution.

In accordance with one aspect, the present invention provides a group spacing device for keeping groups of people at least six feet apart or some other determined distance from other groups of people the group spacing device having four outer connection adapters joined by four corresponding exterior border strips, four inner connection adapters joined by at least four poles, and at least four poles joining the outer connection adapters to corresponding inner connection adapters.

In another aspect, the present invention provides a group spacing device for keeping groups of people at least six feet apart or some other determined distance from other groups of people the group spacing device having four outer connection adapters joined by four corresponding exterior border strips, four inner connection adapters joined by at least four poles, at least four poles joining the outer connection adapters to corresponding inner connection adapters and a fence assembly that mounts to the outer connection adapters so as to stretch across and above the exterior border strips.

In an additional aspect, the present invention provides a group spacing device for keeping groups of people at least six feet apart or some other determined distance from other groups of people the group spacing device having four outer connection adapters joined by four corresponding exterior border strips, four inner connection adapters joined by at least four poles, at least four poles joining the outer connection adapters to corresponding inner connection adapters, a fence assembly that mounts to the outer connection adapters so as to stretch across and above the exterior border strips, a plurality of screw anchors that passes through apertures in the outer connection adapters and or inner connection adapters until stopped by an anchor stop to secure the group spacing device to a sand or ground surface and a tent mountable over the group spacing device.

In accordance with these and other objects, which will become apparent hereinafter, the instant invention will now be described with particular reference to the accompanying drawings.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein:

FIG. 1 is a perspective view of the crowd or group spacing device in accordance with the principles of the present invention;

FIG. 2 is a plan view of the group spacing device shown in FIG. 1 in accordance with the present invention;

FIG. 3 is a side elevational view of the group spacing device shown in FIG. 1 in accordance with the present invention;

FIG. 7 are side elevational and perspective views of the exterior border securing flap of the outer connection adapter for securing the exterior border of the group spacing device of FIG. 1 in accordance with the present invention;

FIG. 8 are top plan and perspective views of the bottom cover of the outer corner connection adapter of the group spacing device of FIG. 1 in accordance with the present invention;

FIG. 10 are perspective and cross-sectional views of the inner corner connection adapter of the group spacing device of FIG. 1 in accordance with the instant invention;

FIG. 11 are top plan and perspective views of the bottom cover of the inner corner connection assembly of the group spacing device of FIG. 1 in accordance with the instant invention;

DETAILED DESCRIPTION OF THE INVENTION

Figure 4:
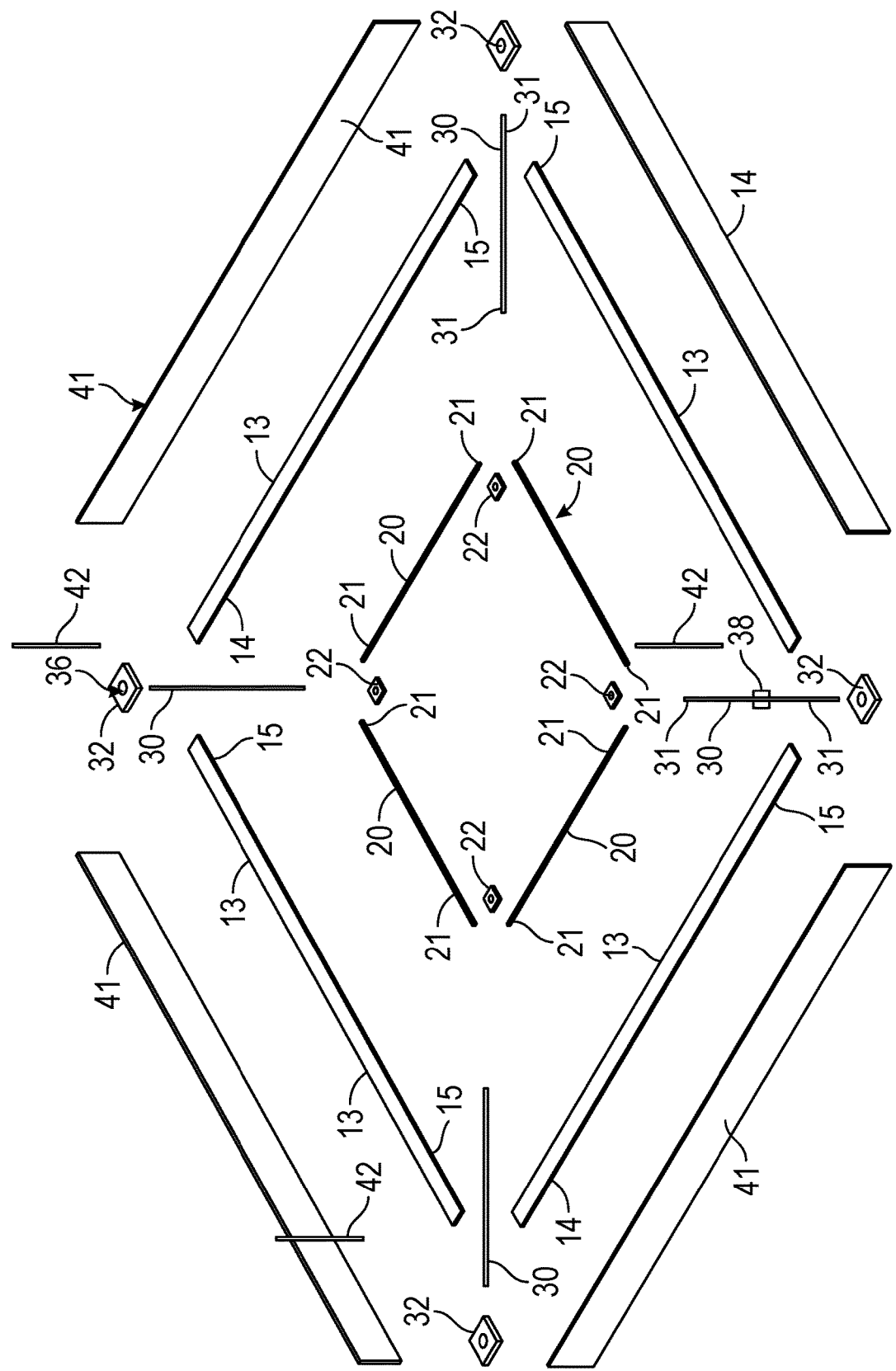
FIG. 4 is an exploded view of the group spacing device of FIG. 1 in accordance with the present invention.
Figure 5:
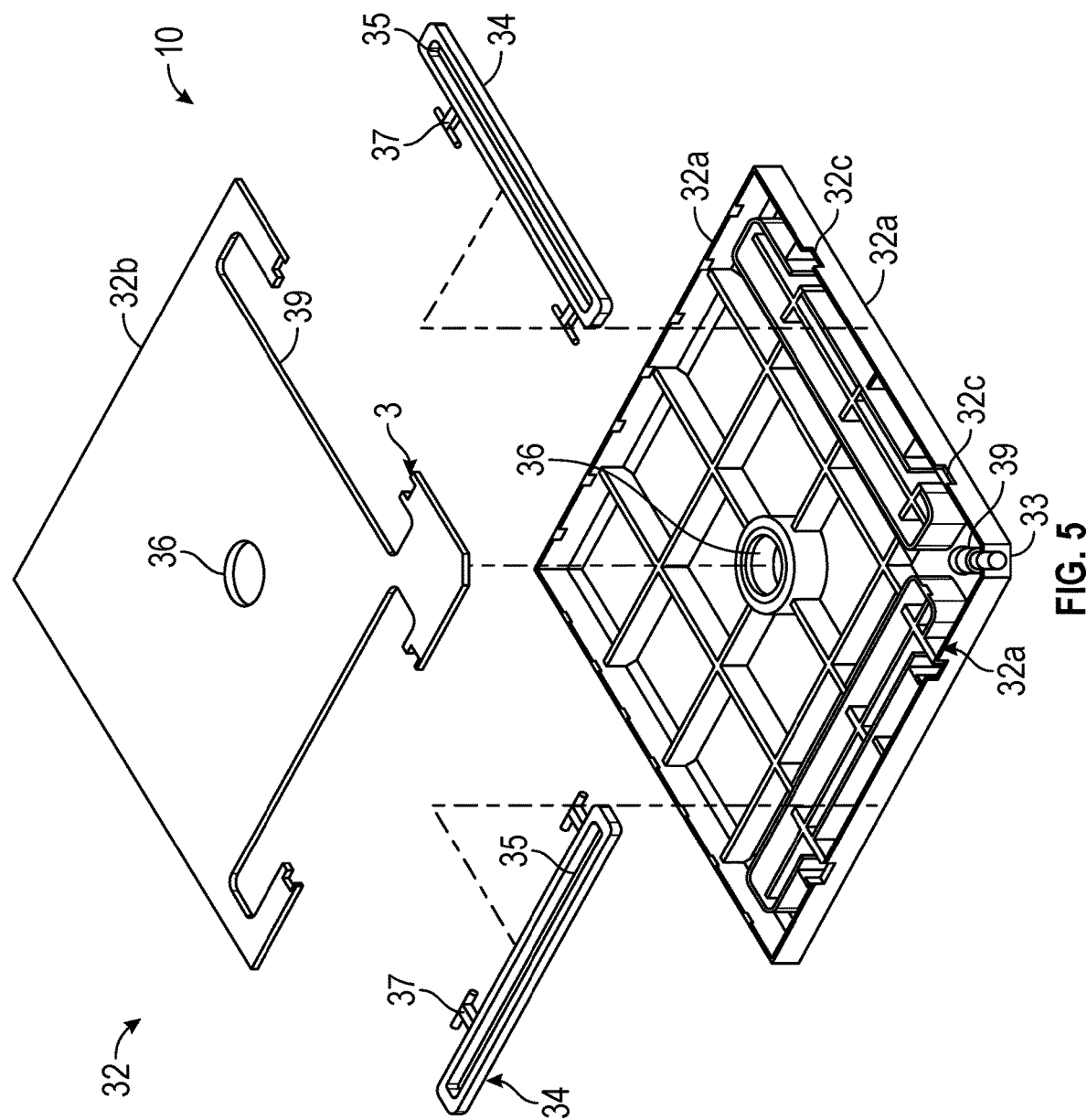
FIG. 5 is an exploded view of the outer corner connection adapter of the group spacing device of FIG. 1 in accordance with the present invention.
Figure 6:
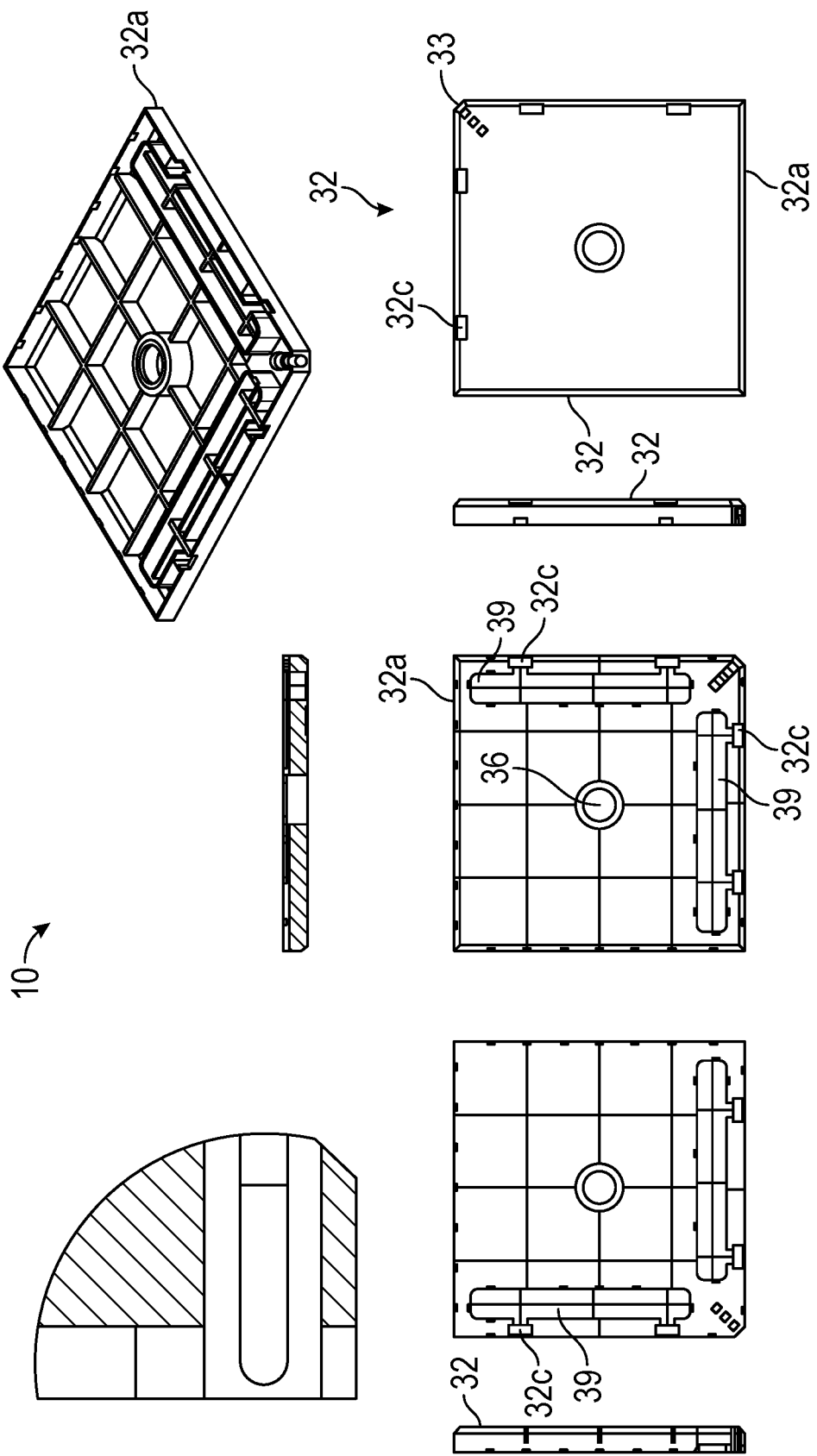
FIG. 6 are plan and cross-sectional views of the outer connection adapter of the group spacing device of FIG. 1 in accordance with the present invention.

With reference to the drawings in which like reference designators refer to like elements, FIGS. 1 to 12 depict the preferred and alternative embodiments of the instant invention which is generally referenced a group or crowd spacing device, instant invention and, or by numeric character 10. There is shown in FIGS. 1-11 a crowd or group spacing device 10 for keeping groups of people at least six feet apart or some other determined distance from other groups of people especially in crowded situations. The instant invention 10 may also be designed to keep people within a given space, such as six feet or some other distance from each other to promote suggested or mandated social distancing from people within the same group. The group spacing device 10 is an assembly that may be taken apart for convenient transportation and storage and easily reassembled for use. The group spacing device 10 may be used on the beach, parks, or other outdoor places where people gather and may be anchored so it does not move or blow away. The group spacing device 10 may also be adapted for indoor use by using adhesive, tape, or flat anchors to secure the device 10.

With reference to FIGS. 1-12, the group spacing device 10 includes a canvassed or uncanvassed user access space 12 being approximately twenty (20) by twenty (20) feet for approximately four hundred (400) square feet of user space 12 defined by four exterior border strips 13 secured at their ends by four (4) corresponding rigid outer corner connection adapters 32, an interior partitioned space 16 defined by four (4) approximately eight (8) foot plastic rods or connecting poles 20 secured at their ends by four (4) corresponding inner corner connection adapters 22, four (4) approximately 8.5 foot diagonal plastic rods or connecting poles 30 that extend from the four (4) inner corner connection adapters 22 to the four corresponding outer corner connection adapters 32 and four fence assemblies 40 each one being supported along the outer edges above a corresponding exterior border strip 13 by a fence support pole 42 plugged into a corresponding outer corner connection adapter support aperture 36. The connecting poles 20, 30 are preferably tent poles or poles made from aluminum but may be made from plastic or PVC in an alternative embodiment, and may be collapsible for easier storage, assembly and disassembly by having a break point 14 dividing the poles 20, 30 in two and connecting them by an elastic tether. The four outer corner adapters 32 are secured at each outer corner of the spacing device 10 by screw anchors 50, shown in FIG. 12, and have structures that defines openings 36 for receiving and engaging the anchors 50 that screw into the sand or ground. The anchors 50 each have an opening 59 at the upper end in alignment with a corresponding outer corner adapter opening 36 for receiving a fence pole 42 such that each fence 41 stretches across and above a corresponding exterior border strip 13. The outer corner adapters 32 each define diagonal port openings 33 in one corner in alignment with diagonal port openings 24 defined in one corresponding corner of the interior corner connection adapters 22 for receiving the respective pole ends 31 of the diagonal connecting poles 30 for securing corresponding ends 31 of the diagonal poles 30. The outer corner adapters 32 are preferably approximately twelve (12) inches by twelve (12) inches for rigidity and stability around the outer perimeter. The inner corner adapters 22 are preferably approximately six (6) inches by six (6) inches. The exterior border strips 13 that bridge the outer corner adapters 32 are preferably approximately eight (8) inches in width.

Still referring to FIGS. 1-12, the outer corner connection adapters 32 are joined by the exterior border strips 13 while the poles 20 that define the interior partitioned space 16 are joined by coinciding inner corner connection adapters 22 which have side openings or ports 23 for receiving the ends 21 of the poles 20 as shown in FIGS. 1, 2 and 4. The ports 23 have ridges 29 for snugly receiving and securing the pole ends 21 in the ports 23 of the inner adapter 22. Each outer corner connection adapter 32 has a flap 34 pivotally attached on adjoining or adjacent sides by hinges 37 wherein the flap 34 has an opening 35 for receiving and passing an end of the exterior border strip 13 which wraps through the opening 35 and is attached to the underside of the strip 13 by hook-and-loop 15, commonly known as Velcro® as shown in FIGS. 1, 2 and 4-6. Each outer corner adapter 32 has one beveled corner with an opening 33 and inner ridges 39 for snugly receiving and securing a diagonal pole 30 end 31. The inner corner adapters 22 also have an angular adapter opening 23 with ridges 29 for snugly receiving and securing the other end 31 of the diagonal pole 30. The inner corner adapters 22 receive and support each inner end 31 of the diagonal support poles 30 which are supported at the opposite far end by the exterior corner adapter 32 in the corresponding diagonal ports 33 defined by the exterior corner adapters 32. Each of the diagonal plastic poles 30 are supported at the corresponding interior ends 31 by the diagonal pole ports 23 in the inner corner adapters 22 and at their opposite ends 31 in, to end, or by the corresponding diagonal pole support ports 33.

The connecting poles 20, 30 may be collapsing poles wherein they are split in or near a midsection break 14 to form two sections that may be joined by an elastic tether. The mid-section of each diagonal pole 30 may be supported by an interior pole support brace 38 which circumvents or embraces and strengthens support in a mid-section of each diagonal pole 30. The interior poles 20 and diagonal poles 30 and exterior strips 13 may be designed to create tautness to prevent the inadvertent shifting inward of the material 12 so as to ensure designated spacing. Accordingly, the exterior strips 13 may be elastic. The interior poles 20 and diagonal poles 30 are described as being tent poles which may be made of aluminum but may be made from other materials such as PVC, injected plastic, a rustproof metal material or comparable substitutes that are somewhat flexible without departing from the scope and spirit of the invention. The corner adapters 22 and 32 may also be manufactured from plastic, injected molded plastic, PVC, rustproof metal or comparable substitutes. The outer border strips 13 are preferably made from Lycra polyester but may me made from a comparable fabric or slightly elastic fabric. The fence support poles or posts 42, inner corner adapters 22 and outer corner adapters are preferably made from plastic or injection molded plastic but may also be made from PVC or other comparable substitutes. The fence 41 is preferably made from a fabric polyester or semi-polyester or comparable material or materials.

With reference to FIGS. 5-8, the outer corner connection adapter 32 has a base section 32a and a cover 32b that snaps to the base 32a for a tight connection while the flap 34 has hinges 37 that extend from an edge of the flap 34 and rest in grooves 32c formed in the base 32a to pivotally attach or mount to the base 32a while the cover 32b secures the flap hinges 32c in the grooves 32c. The diagonal pole outer adapter aperture 33 is formed in a beveled corner of the base 32a and receives the diagonal pole 30 and secures the diagonal pole end 31 with ridges 39 formed in the aperture 33. The outer corner connection adapter 32 defines a central aperture 36 in its base 32a and cover 32b that align when joined for receiving and passing a fence support pole 42 that mates with the anchor pole aperture 59. The outer corner connection adapters 32 include a flap 34 that is pivotally mounted to the outer adapter 32 by way of its hinges 37 that sit in the outer corner base grooves 32c and that includes an outer border strip aperture 35 for receiving and passing a corresponding end of a border strip 13 that wraps through and under itself for connecting to hook-and-loop (Velcro®) on the opposite or underside of the strip 13.

Figure 9:
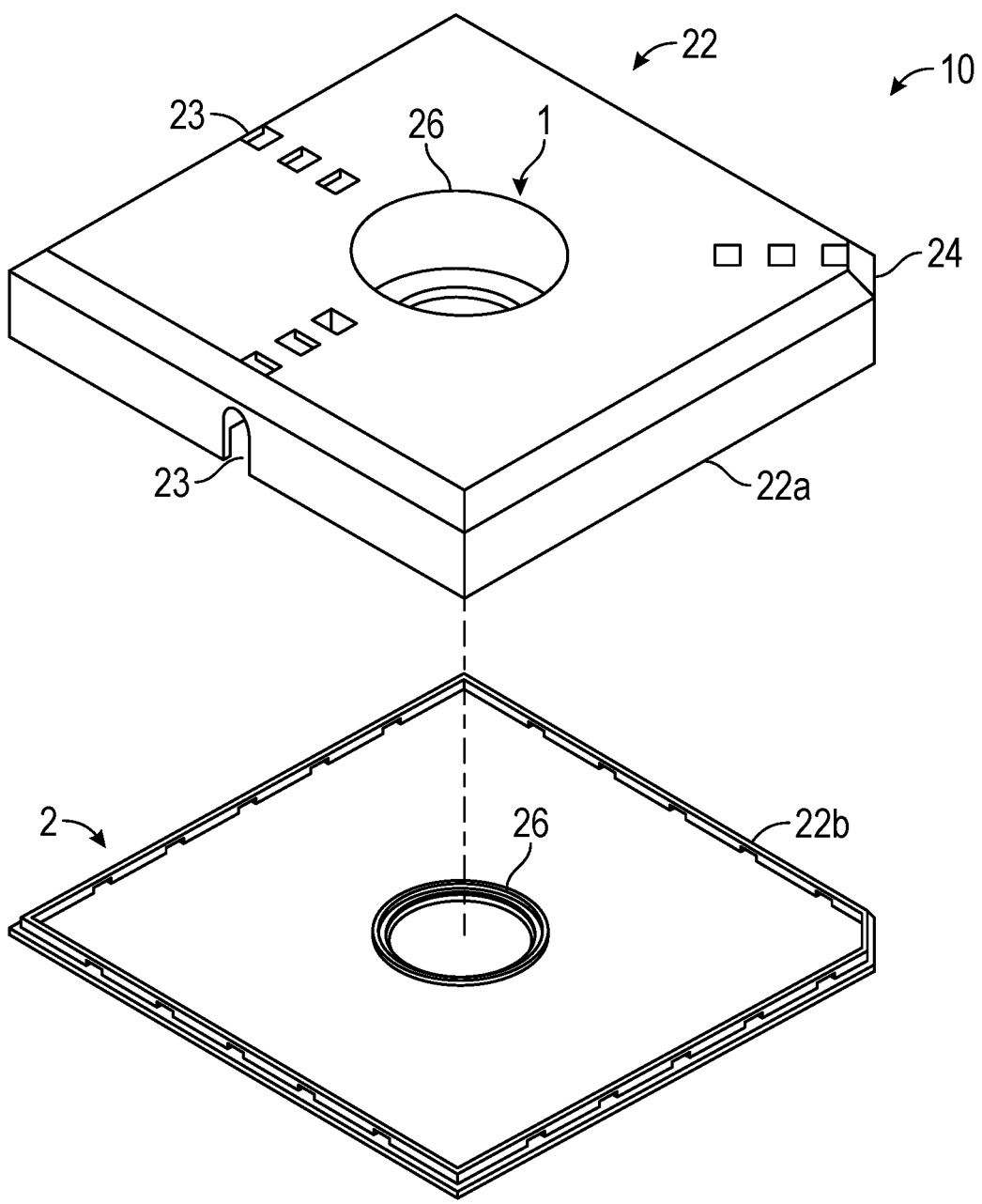
FIG. 9 are perspective and partially exploded views of the inner corner connection adapter of the group spacing device of FIG. 1 in accordance with the instant invention.

With reference to FIGS. 9-11, the inner corner connection adapter 22 has a base section 22a and cover section 22b that snaps to the base 22a for a tight connection. The inner adapter base section 22a together with the cover 22b define side openings or ports 23 on adjacent sides that align with a corresponding inner corner adapter 22 for receiving the ends 21 of interior space defining poles 20 to create the interior partitioned space 16, Each port 23 defines interior ridges 29 that protrude into the port 23 to snugly receive and secure the poles 20. The adapter base 22a and cover 22b define a beveled corner with a diagonal pole port 24 with interior ridges 29 that snugly receive and secure the end 31 of a diagonal pole 30. The ridges 29 protrude slightly into the ports 23, 24 to facilitate the tight fit with the poles 20, 30 and pole ends 21, 31.

Figure 12:
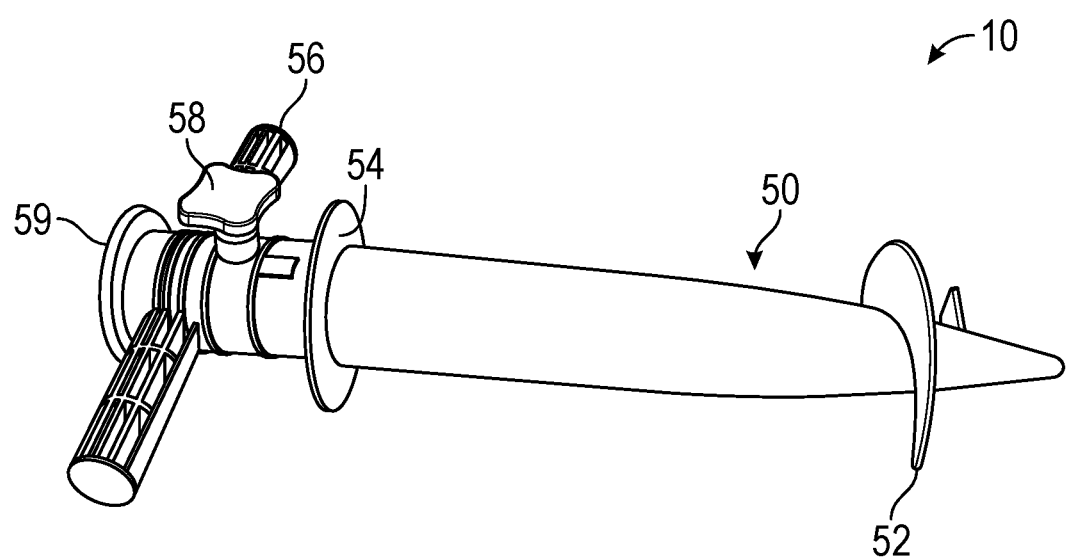
FIG. 12 is a perspective view of an anchor used to secure the inner and or outer corner connection adapters of the group spacing device of FIG. 1 to sand or ground surfaces in accordance with the instant invention.

With reference to FIG. 12, the anchor 50 has an elongated body with a screw end having screw fins 52 at one end and an anchor stop 54, fence pole tightening screw 58 and fence pole aperture 59 at the opposite end. The anchor 50 may also have a handle 56 for screwing the anchor 50 into the sand or ground. An anchor 50 is preferably placed at each outer corner through the outer corner adapter aperture 36 defined in the outer corner connection adapter 32 and may also be placed in each inner corner connection adapter 22 through the inner adapter aperture 26. The anchor 50 passes through the outer adapter aperture 36 and or inner adapter aperture 26 until the anchor stop 54 makes contact with the adapter 22, 32 preventing it from passing completely through so as to secure the adapters 22, 32 to the sand or ground surface. The handle 56 may be used to turn the anchor into and out of the sand or ground surface. When the fence poles 42 are placed in the anchor fence pole support apertures 59, the fence pole tightening screws 58 are turned to tighten against the poles 42. When removing the group spacing device 10, the tightening screws 58 are turned to relieve tension on the poles 42 so they may be removed and the anchors 50 are turned so as to retract out from the sand or ground surface. The strips Now referring to FIGS. 1-4, the group spacing device 10 may include a fence assembly structure 40 to provide a vertical barrier around the exterior edges 13. The fence assembly structure 40 has a fence 41 supported at opposite ends by vertical fence support poles 42. The outer corner adapters 32 have central slots 36 and the anchor 50 includes aperture 59 for vertically receiving and supporting the vertical fence support poles 42. The fences 40 is preferably approximately 2 feet high and may vary in length but preferably stretch along a complete side. In an alternative embodiment, the fences 40 may also be plugged into support openings 26 and or anchors 50 in the internal corner adapters 22. The fences 40, however, are preferred along the exterior canvas edges 13 to mark off and protect the entire group spacing device 10 from others or ingress or egress, such as by children or objects. It also clearly defines the safe space.

The instant invention 10 may also include an umbrella. The umbrella preferably has four arcuate legs that bend to form a supporting are at a mid-point to support a canvas stretched over the leg and free ends at the lower ends for insertion into the openings in the corner support adapters 32. The canvas would have hooks, adhesive or hardware for mounting the canvas to the legs. The canvas may stretch downward over the legs. The umbrella preferably has or forms a doom shape. The umbrella may preferably form a doom shaped umbrella. The dimensions of the umbrella would be dictated by the size of the group spacing device 10. The instant invention 10 may also include a canvas or other substrate material stretching across said inner surface 12.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A group spacing device, comprising:
  a plurality of outer connection adapters;
  a plurality of border strips joining corresponding ones of said outer connection adapters to form a first defined space;

a plurality of inner connection adapters joined by a plurality of poles wherein each pole connects to corresponding inner connection adapters to define a second defined space, said second defined space being inside and smaller than said first defined space;

a plurality of flaps, each of said flaps being pivotally mounted to cooperating sides of corresponding outer connection adapters, said flaps each having an aperture, each said aperture receiving an end of one of said border strips for securing said border strips;

a pair of hinges defined by said flaps for pivotally mounting to said outer connection adapters;

a plurality of diagonal positioned poles joining said outer connection adapters to corresponding inner connection adapters;

apertures defined in corresponding corners of said outer connection adapters and said inner connection adapters for receiving said diagonal position poles so as to join said outer connection adapters and said inner connection adapters; and apertures defined in corresponding sides of said inner connection adapters for receiving said poles so as to join said inner connection adapters.

2. The group spacing device of claim 1, further comprising:

a canvas substrate inside said second defined space.

3. The group spacing device of claim 1, further comprising:

a canvas substrate inside said first defined space.

4. The group spacing device of claim 1, further comprising:

a tent mountable to said outer connection adapters over said first defined space.

5. The group spacing device of claim 1, further comprising:

a fence assembly mountable to said outer connection adapters.

6. The group spacing device of claim 1, further comprising:

hook-and-loop on a surface of each of said border strips for securing each of said border strips to itself once passed through said corresponding one of said flaps.

7. A group spacing device, comprising:

a plurality of outer connection adapters;

a plurality of border strips joining corresponding ones of said outer connection adapters to form a first defined space;

a plurality of inner connection adapters joined by a plurality of poles wherein each pole connects to corresponding inner connection adapters to define a second defined space, said second defined space being inside and smaller than said first defined space;

a plurality of flaps pivotally mounted to said outer connection adapters, each of said outer connection adapters having one of said flaps pivotally mounted to two adjacent sides of one of said outer connection adapters and to corresponding sides of another one of said outer connection adapters, each of said flaps having an aperture for receiving and passing an end of said border strips;

a plurality of diagonal positioned poles joining said outer connection adapters to corresponding inner connection adapters;

apertures defined in corresponding corners of said outer connection adapters and said inner connection adapters for receiving said diagonal position poles so as to join said outer connection adapters and said inner connection adapters; and apertures defined in corresponding sides of said inner connection adapters for receiving said poles so as to join said inner connection adapters.

8. The group spacing device of claim 7, further comprising:

hook-and-loop on a surface of each of said border strips for securing each of said border strips to itself once passed through said corresponding one of said flaps.

\* \* \* \* \*